US012806459B2

(12) United States Patent
Fujita et al.

(10) Patent No.: US 12,806,459 B2
(45) Date of Patent: Nov. 24, 2026

(54) RADIANT HEAT PROTECTION DEVICE, RADIANT HEAT PROTECTION METHOD, AND SERVICE VEHICLE

(71) Applicant: MITSUBISHI HEAVY INDUSTRIES, LTD., Tokyo (JP)

(72) Inventors: Jun Fujita, Tokyo (JP); Hisanori Amano, Tokyo (JP); Yoshihiro Tamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 597 days.

(21) Appl. No.: 17/775,672

(22) PCT Filed: Oct. 16, 2020

(86) PCT No.: PCT/JP2020/039095
§ 371 (c)(1),
(2) Date: May 10, 2022

(87) PCT Pub. No.: WO2021/100376
PCT Pub. Date: May 27, 2021

(65) Prior Publication Data
US 2022/0387832 A1 Dec. 8, 2022

(30) Foreign Application Priority Data
Nov. 22, 2019 (JP) ................................ 2019-211645

(51) Int. Cl.
*A62C 27/00* (2006.01)
*A62C 2/06* (2006.01)
*B60K 11/04* (2006.01)

(52) U.S. Cl.
CPC ................ *A62C 27/00* (2013.01); *A62C 2/06* (2013.01); *B60K 11/04* (2013.01)

(58) Field of Classification Search
USPC ...................................................... 169/48, 62
See application file for complete search history.

(56) References Cited

U.S. PATENT DOCUMENTS 3,708,194 A * 1/1973 Amit ..................... B60R 19/205
141/98
2010/0294520 A1* 11/2010 Aguirre ................ A62C 3/0257
169/48

FOREIGN PATENT DOCUMENTS

JP H09-10347 A 1/1997
JP H10-118212 A 5/1998
JP 2003-210602 A 7/2003
(Continued)

OTHER PUBLICATIONS

Written Opinion dated Nov. 10, 2020, issued in counterpart International application No. PCT/JP2020/039095, with English translation. (10 pages).

(Continued)

*Primary Examiner* — Christopher S Kim
(74) *Attorney, Agent, or Firm* — WHDA, LLP

(57) ABSTRACT

A radiant heat protection device, a radiant heat protection method, and a service vehicle include a radiant heat reflector (51) having a reflective surface (51*a*) that reflects radiant heat (H), a coolant retainer (52) disposed on a back surface (51*b*) of the reflective surface (51*a*) of the radiant heat reflector (51) and capable of retaining coolant (C), and a coolant feed device (53) configured to feed the coolant (C) to the coolant retainer (52).

7 Claims, 5 Drawing Sheets

(56) References Cited

FOREIGN PATENT DOCUMENTS

| | | | |
|---|---|---|---|
| JP | 2012-12911 | A | 1/2012 |
| JP | 2017-179944 | A | 10/2017 |
| JP | 2017-206788 | A | 11/2017 |

OTHER PUBLICATIONS

International Search Report dated Nov. 10, 2020, issued in counterpart International application No. PCT/JP2020/039095, with English translation. (5 pages).

* cited by examiner

RADIANT HEAT PROTECTION DEVICE, RADIANT HEAT PROTECTION METHOD, AND SERVICE VEHICLE

FIELD

The present invention relates to a radiant heat protection device and a radiant heat protection method for providing protection from radiant heat of flames in, for example, various operations at fire scenes, and to a service vehicle equipped with the radiant heat protection device.

BACKGROUND

When a fire occurs at a facility, operators, in general, go to the fire scene in fire trucks and discharge water to extinguish the fire. Flames of a fire scene generate thermal radiation, which is one of the phenomena of transferring thermal energy. The operators and fire trucks need to be protected from the radiant heat. Patent Literature 1, for example, describes a firefighting robot equipped with a self-cooling device.

CITATION LIST

Patent Literature

Patent Literature 1: Japanese Patent Application Laid-open No. H10-118212

SUMMARY

Technical Problem

Such a conventional firefighting robot is equipped with a self-cooling device to protect itself from radiant heat of flames. In some cases, the self-cooling device cools the firefighting robot by, for example, spraying extinguishing agent or water to it. The self-cooling device requires a large amount of extinguishing agent or water to cool the firefighting robot. The extinguishing agent or water may be fed from an external source to the firefighting robot, or loaded on the robot in advance using a container such as a large tank. Extinguishing agent and water, however, are precious in the fire scene. If a large amount of the extinguishing agent or water is used to cool the firefighting robot, shortage of the extinguishing agent or water may cause a problem in the firefighting operations.

The present invention has been made to solve the aforementioned problem and an object of the present invention is to provide a radiant heat protection device, a radiant heat protection method, and a service vehicle that improve workability and safety of various operations by blocking radiant heat of flames efficiently.

Solution to Problem

In order to achieve the aforementioned object, a radiant heat protection device according to the present invention includes: a radiant heat reflector having a reflective surface that reflects radiant heat; a coolant retainer disposed on a back surface of the reflective surface of the radiant heat reflector and capable of retaining coolant; and a coolant feed device configured to feed the coolant to the coolant retainer.

Accordingly, the radiant heat reflector reflects the radiant heat on the reflective surface, the coolant feed device feeds the coolant to the coolant retainer, and the coolant retainer retains the coolant on the back surface of the reflective surface of the radiant heat reflector. The radiant heat reflector reflects most of the radiant heat on the reflective surface, but radiant heat not reflected on the reflective surface heats the radiant heat reflector. The heated radiant heat reflector evaporates the coolant, so that the radiant heat reflector can be cooled. The coolant feed device feeds the coolant, as appropriate, in such an amount that the coolant retainer can retain. As a result, the radiant heat of the flames is blocked efficiently with a small amount of the coolant, so that workability and safety of various operations can be improved.

In the radiant heat protection device, the coolant retainer opens at least in an upper part thereof to outside and cools the radiant heat reflector by heat of vaporization due to evaporation of the retained coolant.

Since the coolant retainer opens in the upper part thereof to the outside, the upper opening can exhaust, to the outside, the vapor generated during the evaporation of the coolant retained by the coolant retainer, so that the radiant heat reflector can be cooled properly by heat of vaporization due to the evaporation.

In the radiant heat protection device, the coolant feed device includes a spray nozzle configured to spray the coolant.

Since the coolant feed device includes the spray nozzle that sprays coolant, the coolant can be fed properly to a wide area of the coolant retainer by being sprayed from the spray nozzle.

In the radiant heat protection device, the coolant feed device feeds the coolant to the coolant retainer at a regular interval.

Since the coolant feed device feeds the coolant to the coolant retainer at regular intervals, excessive feeding of coolant to the coolant retainer is suppressed, so that the use of the coolant can be reduced.

The radiant heat protection device further includes: a thermo sensor configured to measure temperature of the back surface of the radiant heat reflector; and a control device configured to activate the coolant feed device when the temperature of the back surface measured by the thermo sensor exceeds a preset upper temperature limit.

Since the coolant feed device is activated at and above the upper temperature limit of the back surface of the radiant heat reflector, an appropriate amount of the coolant is fed to the coolant retainer, so that heat transfer from the radiant heat reflector to a member to which the radiant heat reflector is mounted can be suppressed and the use of coolant can be reduced.

A radiant heat protection method according to the present invention includes: a step of reflecting radiant heat on a reflective surface of a radiant heat reflector; and a step of feeding coolant to a coolant retainer disposed on a back surface of the reflective surface of the radiant heat reflector.

Accordingly, the radiant heat reflector can be cooled by heat of vaporization due to the evaporation of the coolant. As a result, the radiant heat of the flames is blocked efficiently with a small amount of the coolant, so that workability and safety of various operations can be improved.

A service vehicle according to the present invention includes: a vehicle body; a traveling device configured to cause the vehicle body to travel; and the radiant heat protection device disposed at a periphery of the vehicle body.

Accordingly, the radiant heat reflector can be cooled by heat of vaporization due to the evaporation of the coolant, thereby protecting the vehicle body. As a result, the radiant heat of the flames is blocked efficiently with a small amount of the coolant, so that workability and safety of various operations can be improved.

In the service vehicle, the radiant heat reflector and the coolant retainer are disposed at a periphery of the vehicle body, and the coolant feed device is disposed at the vehicle body.

Since the radiant heat reflector and the coolant retainer are disposed at a periphery of the vehicle body, the vehicle body can be protected efficiently.

The service vehicle further includes a water-discharging device, wherein the coolant feed device is connected with the water-discharging device such that water used as the coolant is feedable.

Since the coolant feed device uses the water fed from the water-discharging device as the coolant, the radiant heat reflector can be cooled by the coolant retainer while water is being discharged.

Advantageous Effects of Invention

With the radiant heat protection device, the radiant heat protection method, and the service vehicle according to the present invention, the radiant heat of flames is blocked efficiently, so that workability and safety of various operations can be improved.

DESCRIPTION OF EMBODIMENTS

The following describes preferred embodiments of the present invention with reference to the accompanying drawings. The embodiments are not intended to limit the scope of the present invention. When there are a plurality of embodiments, the embodiments may be combined as appropriate and included in the scope of the present invention.

First Embodiment

Figure 1:
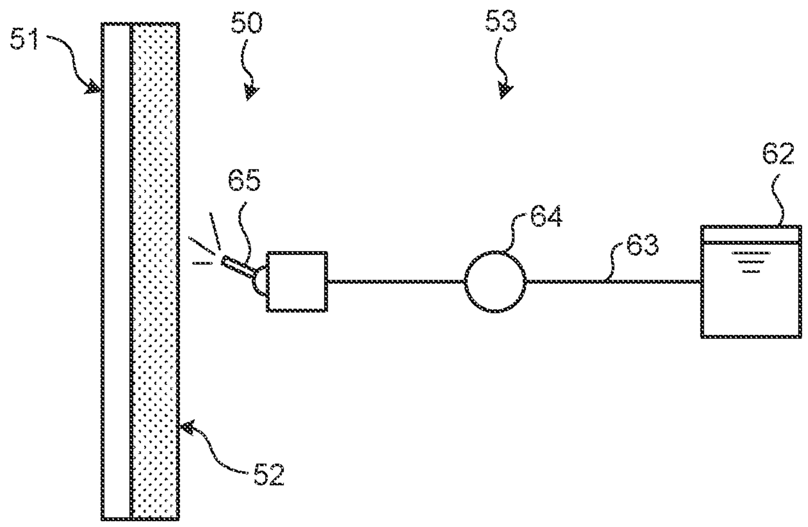
FIG. 1 is a schematic view generally illustrating a radiant heat protection device according to a first embodiment.
Figure 2:
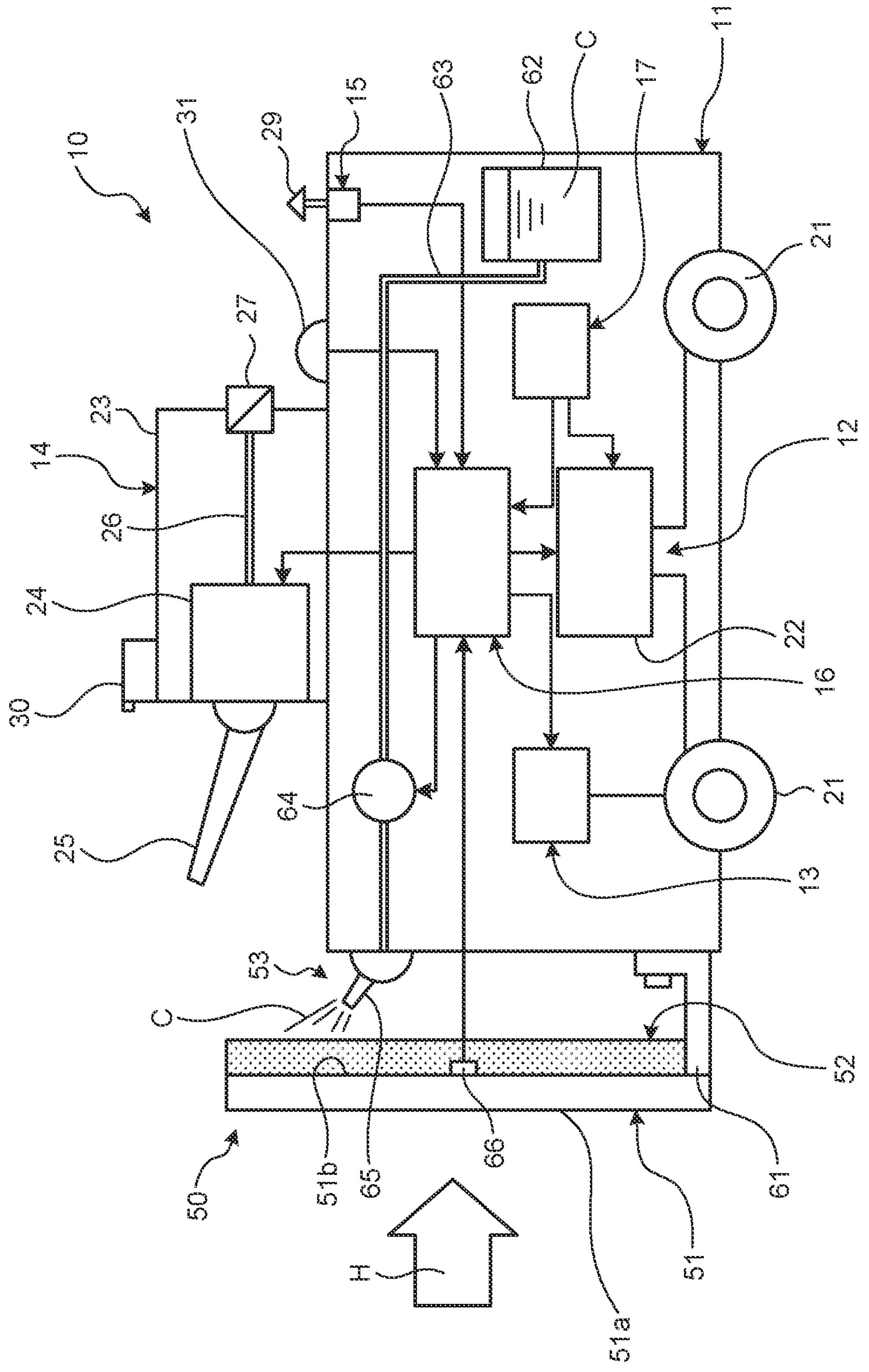
FIG. 2 is a schematic view generally illustrating a service vehicle equipped with the radiant heat protection device according to the first embodiment.

FIG. 1 is a schematic view generally illustrating a radiant heat protection device according to a first embodiment and FIG. 2 is a schematic view generally illustrating a service vehicle equipped with the radiant heat protection device according to the first embodiment.

In the first embodiment, the radiant heat protection device according to the present invention is installed to a water-discharging vehicle (fire truck) that is described as a service vehicle. As illustrated in FIGS. 1 and 2, this radiant heat protection device 50 is mounted to a front part of a water-discharging vehicle (service vehicle) 10 in the direction in which the water-discharging vehicle 10 receives radiant heat, or in the traveling direction.

First, the water-discharging vehicle 10 is described. The water-discharging vehicle 10 is remotely controlled with an operating device (not illustrated). The water-discharging vehicle 10 includes a vehicle body 11, a traveling device 12, a steering device 13, a water-discharging device 14, a wireless device (or wired device) 15, a control device 16, and a battery 17.

The vehicle body 11 is provided with the traveling device 12 disposed at a lower part thereof and can move by traveling forward and backward and to the right and to the left. The traveling device 12 includes four drive wheels 21 and a drive device 22. The four drive wheels 21 are disposed at the lower part of the vehicle body 11 and are rotatably driven by the drive device 22 disposed inside the vehicle body 11. The traveling device 12 is not limited to the drive wheels 21 and may include, for example, crawlers. The steering device 13 is disposed inside the vehicle body 11 and can move the vehicle body 11 to the left or to the right by steering the front wheels of the four drive wheels 21.

The water-discharging device 14 is disposed at an upper part of the vehicle body 11. The water-discharging device 14 includes a discharging deck 23, a drive unit 24, and a deck gun 25. The discharging deck 23 is fixed to the upper part of the vehicle body 11 and includes the drive unit 24. The deck gun 25 is mounted to the drive unit 24. The water-discharging device 14 has a hose coupler 27 that is connected to the drive unit 24 via a connecting pipe 26. The hose coupler 27 is connectable to an end of a discharging hose 28 (see FIG. 3).

The wireless device 15 is disposed at an upper part of the vehicle body 11. The wireless device 15 includes an antenna 29. The wireless device 15 can transmit and receive various types of signals wirelessly to and from the operating device (not illustrated). The vehicle body 11 also includes a camera 30 and a global positioning system (GPS) sensor 31.

The control device 16 is disposed inside the vehicle body 11. The control device 16 is connected to the traveling device 12, the steering device 13, the water-discharging device 14, and the wireless device 15 and can control these devices. The battery 17 is disposed inside the vehicle body 11. The battery 17 is connected to the drive device 22 of the traveling device 12, the steering device 13, the water-discharging device 14, the wireless device 15, and the control device 16 to supply power to these devices.

The radiant heat protection device 50 is disposed at the front of the vehicle body 11. The radiant heat protection device 50 includes a radiant heat reflector 51, a coolant retainer 52, and a coolant feed device 53.

The radiant heat reflector 51 is a flattened member having a certain thickness, and has a reflective surface 51*a* that reflects radiant heat H. The radiant heat reflector 51 reflects and blocks most of the radiant heat H of flames on the reflective surface 51*a*, thereby suppressing heat transfer to the vehicle body 11. The radiant heat reflector 51 is disposed at the front of the vehicle body 11 in the traveling direction and is mounted to the vehicle body 11 via a bracket 61. In this case, a predetermined space between the radiant heat reflector 51 and the vehicle body 11 is made.

The coolant retainer 52 is disposed on a back surface 51*b* of the reflective surface 51*a* of the radiant heat reflector 51 and can retain coolant C. The coolant retainer 52 is a water-absorbent member that can retain, if temporarily, the coolant C. The coolant retainer 52 is, for example, sponge or cloth. The coolant C is evaporated by heat and is, for example, water. The coolant retainer 52 is a flattened member having a certain thickness, and is closely fixed to the back surface 51*b* of the reflective surface 51*a* of the radiant heat reflector 51. A predetermined space between the coolant retainer 52 and the vehicle body 11 is made. The coolant retainer 52 may cover a surface other than the surface of the back surface 51*b* of the radiant heat reflector 51 to which the coolant retainer 52 is closely fixed. In this case, the coolant retainer 52 is supported such that it opens at least upward in the vertical direction to the outside, in other words, the upper part of the coolant retainer 52 is in contact with the atmosphere. The coolant retainer 52 can cool the radiant heat reflector 51 by heat of vaporization due to the evaporation of the retained coolant C.

The coolant feed device 53 is configured to feed the coolant C to the coolant retainer 52. The coolant feed device 53 includes a storage tank 62, a coolant feed pipe 63, a coolant feed pump 64, and a coolant spray nozzle 65. The storage tank 62 is disposed inside the vehicle body 11. The coolant spray nozzle 65 is disposed at the front of the vehicle body 11 and faces an upper portion of the coolant retainer 52. The coolant feed pipe 63 connects the storage tank 62 with the coolant spray nozzle 65. The coolant feed pump 64 is provided to the coolant feed pipe 63 to feed the coolant C in the storage tank 62 to the coolant spray nozzle 65 via the coolant feed pipe 63. The coolant spray nozzle 65 sprays the fed coolant C to the coolant retainer 52.

The coolant feed pump 64 is connected to the control device 16. The control device 16 drives the coolant feed pump 64 to feed the coolant C in the storage tank 62 to the coolant spray nozzle 65, and the coolant spray nozzle 65 sprays the coolant C to the coolant retainer 52. The control device 16 drives the coolant feed pump 64 in accordance with, for example, the absorbency of the coolant retainer 52 and feeds the coolant C to the coolant retainer 52 intermittently at regular intervals. The radiant heat reflector 51 may include a thermo sensor 66 on the back surface 51*b* to measure the temperature. The control device 16 may be connected to the thermo sensor 66 and may activate the coolant feed pump 64 when the temperature of the back surface 51*b* measured by the thermo sensor 66 exceeds a preset upper temperature limit. In this case, the upper temperature limit is set in accordance with the heat resistant temperature of the radiant heat reflector 51.

Next, described is a firefighting method of the water-discharging vehicle 10 equipped with the radiant heat protection device 50 described above. The operating device of the water-discharging vehicle 10 is located in, for example, an administration building in a safe administration area away from the fire scene and not affected by fire. An operator in the administration building remotely controls the water-discharging vehicle 10 with the operating device to move the water-discharging vehicle 10 from the administration building to the discharge area of the fire scene. The discharge area is, for example, a fire scene in a high-temperature atmosphere in which a firefighting target is located and a place that operators are difficult to approach.

When the operator in the administration building remotely operates the water-discharging vehicle 10 to the discharge area of the fire scene, the water-discharging vehicle 10 is connected with a hose-installed vehicle (not illustrated) using a discharging hose in advance, and the two machines are moved together. In moving, the two machines may be remotely operated with the operating device, or the water-discharging vehicle may be remotely operated, with the hose-installed vehicle being automatic-tracking controlled. After the water-discharging vehicle arrives at the discharge area, the hose-installed vehicle moves toward a water source such as a hydrant or a pumper while extending the on-board discharging hose 28 with the water-discharging vehicle left at the discharge area.

As the water-discharging vehicle 10 approaches the fire scene, the water-discharging vehicle 10 is getting thermally affected by fire. However, the radiant heat protection device 50 protects the vehicle body 11 of the water-discharging vehicle 10 from heat. In other words, the radiant heat reflector 51 reflects and blocks most of the radiant heat H of flames on the reflective surface 51*a*, thereby suppressing heat transfer to the vehicle body 11. The control device 16 drives the coolant feed pump 64 to feed the coolant C in the storage tank 62 through the coolant feed pipe 63 to the coolant spray nozzle 65. The coolant spray nozzle 65 sprays the fed coolant C to the coolant retainer 52. The coolant retainer 52 retains the coolant C fed from the coolant spray nozzle 65.

In other words, the radiant heat reflector 51 is heated by reflecting the radiant heat H on the reflective surface 51*a* and the temperature rises. The radiant heat reflector 51 is in close contact with the coolant retainer 52 retaining the coolant C. Accordingly, the coolant C retained by the coolant retainer 52 is heated by the heat of the radiant heat reflector 51 to a high temperature and evaporated into vapor. The radiant heat reflector 51 is then cooled by heat of vaporization due to the evaporation of the coolant C retained by the coolant retainer 52.

When the hose-installed vehicle arrives at a water source, another end of the discharging hose 28 is connected to the water source. The control device 16 controls the drive unit 24 of the water-discharging device 14 to discharge extinguishing water fed from the water source via the discharging hose 28 through the deck gun 25 to the fire scene, and the firefighting operation starts.

Figure 3:
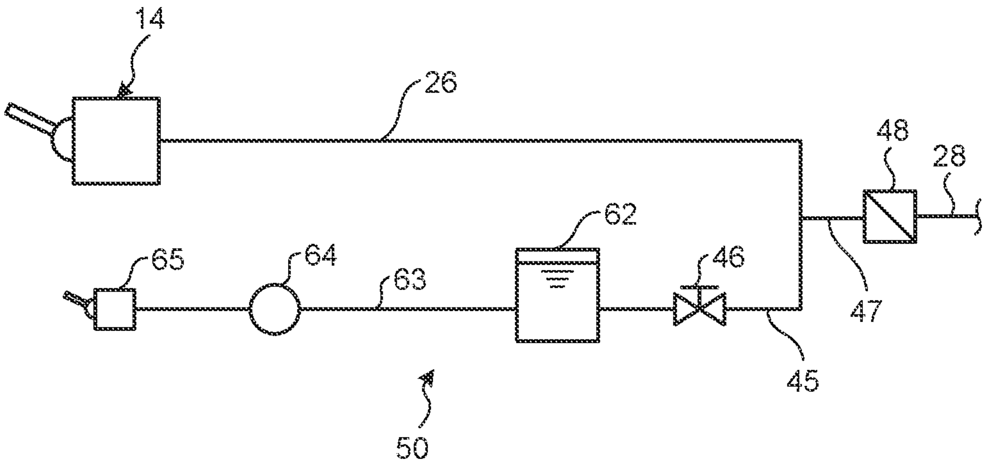
FIG. 3 is a schematic view illustrating a feeding path of extinguishing water.

The coolant C in the storage tank 62 may run out during the operation of the radiant heat protection device 50, and therefore, the extinguishing water fed from a water source through the discharging hose 28 to the water-discharging device 14 may be used as the coolant C. FIG. 3 is a schematic view illustrating a feeding path of the extinguishing water.

As illustrated in FIG. 3, the water-discharging device 14 is connected with the connecting pipe 26. The coolant spray nozzle 65 of the coolant feed device 53 is connected to the storage tank 62 via the coolant feed pipe 63 and the coolant feed pump 64. The storage tank 62 is connected with a coolant replenishing pipe 45. The coolant replenishing pipe 45 has a valve 46. An end of the connecting pipe 26 is joined with an end of the coolant replenishing pipe 45 to be a single connecting pipe 47 to which a hose coupler 48 is connected. The discharging hose 28 is connectable to the hose coupler 48. Accordingly, when the coolant C in the storage tank 62 decreases, the valve 46 is opened to feed, to the storage tank 62, some amount of extinguishing water fed from the discharging hose 28 to the water-discharging device 14 through the connecting pipe 26.

The radiant heat protection device according to the first embodiment includes the radiant heat reflector 51 having the reflective surface 51*a* that reflects the radiant heat H, the coolant retainer 52 disposed on the back surface 51*b* of the reflective surface 51*a* of the radiant heat reflector 51 and capable of retaining the coolant C, and the coolant feed device 53 configured to feed the coolant C to the coolant retainer 52.

Accordingly, the radiant heat reflector 51 reflects the radiant heat H on the reflective surface 51*a*, the coolant feed device 53 feeds the coolant C to the coolant retainer 52, and the coolant retainer 52 retains the coolant C on the back surface 51*b* of the radiant heat reflector 51. The radiant heat reflector 51 is heated by reflecting the radiant heat H on the reflective surface 51*a*. The coolant C retained by the coolant retainer 52 is heated by the heat of the radiant heat reflector 51. The coolant C is then evaporated and the radiant heat reflector 51 can be cooled by heat of vaporization due to the evaporation of the coolant C. As a result, overheat of the radiant heat reflector 51 can be prevented, so that the durability of the radiant heat reflector 51 can be increased. Since the radiant heat reflector 51 is cooled with a small amount of the coolant, the storage tank 62 of the coolant C accommodated in the vehicle body 11 can reduce in size. Furthermore, suppressing use of a large amount of the coolant C does not cause a problem in the firefighting operation at the fire scene. As a result, the radiant heat of the flames is blocked efficiently, so that workability and safety of various operations can be improved.

In the radiant heat protection device according to the first embodiment, the coolant retainer 52 opens at least in an upper part thereof to the outside and cools the radiant heat reflector 51 by heat of vaporization due to the evaporation of the retained coolant C. Accordingly, if the coolant C retained by the coolant retainer 52 evaporates, the vapor thereof can be exhausted through the upper opening to the outside, so that the radiant heat reflector 51 can be cooled properly by heat of vaporization due to the evaporation.

The coolant feed device 53 of the radiant heat protection device according to the first embodiment includes the coolant spray nozzle 65 that sprays the coolant C. Accordingly, the coolant C sprayed by the coolant from the coolant spray nozzle 65 can be fed properly to a wide area of the coolant retainer 52.

The coolant feed device 53 of the radiant heat protection device according to the first embodiment feeds the coolant C to the coolant retainer 52 at regular intervals. Accordingly, excessive feeding of the coolant C to the coolant retainer 52 is suppressed, so that the use of the coolant C can be reduced.

The radiant heat protection device according to the first embodiment includes the thermo sensor 66 that measures the temperature of the back surface 51*b* of the radiant heat reflector 51 and the control device 16 that activates the coolant feed device 53 when the temperature of the back surface 51*b* measured by the thermo sensor 66 exceeds a preset upper temperature limit. Accordingly, an appropriate amount of the coolant C is fed to the coolant retainer 52, so that heat transfer from the radiant heat reflector 51 to the water-discharging vehicle 10 can be suppressed and the use of the coolant C can be reduced.

The service vehicle according to the first embodiment includes the vehicle body 11, the traveling device 12 that causes the vehicle body 11 to travel, and the radiant heat protection device 50 disposed at least at the front of the vehicle body 11 in the traveling direction. Accordingly, the radiant heat reflector 51 can be cooled by heat of vaporization due to the evaporation of the coolant C and the vehicle body 11 can be protected. As a result, the radiant heat H of the flames efficiently with a small amount of the coolant C, so that workability and safety of various operations can be improved.

The service vehicle according to the first embodiment includes the water-discharging device 14, and the coolant feed device 53 is connected with the water-discharging device 14 such that the water used as the coolant is feedable. Accordingly, the radiant heat reflector 51 can be cooled by the coolant retainer 52 while water is being discharged.

The radiant heat protection method according to the first embodiment includes a step of reflecting the radiant heat H on the reflective surface 51*a* of the radiant heat reflector 51 and a step of feeding the coolant C to the coolant retainer 52 on the back surface 51*b* of the reflective surface 51*a* of the radiant heat reflector 51. Accordingly, the radiant heat reflector 51 can be cooled by heat of vaporization due to the evaporation of the coolant C. As a result, the radiant heat H of the flames is blocked efficiently with a small amount of the coolant C, so that workability and safety of various operations can be improved.

Second Embodiment

Figure 4:
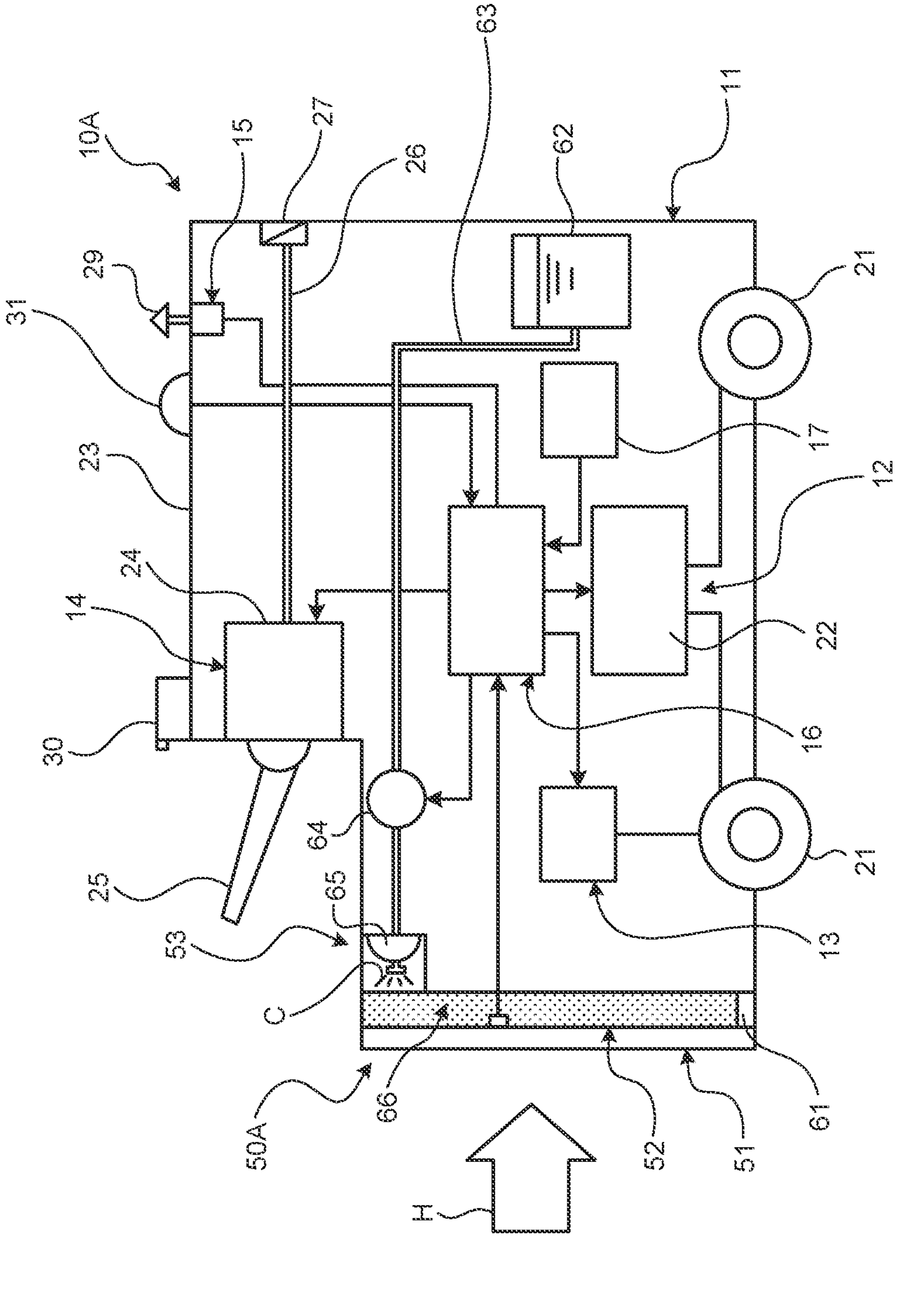
FIG. 4 is a schematic view generally illustrating a service vehicle equipped with a radiant heat protection device according to a second embodiment.
Figure 5:
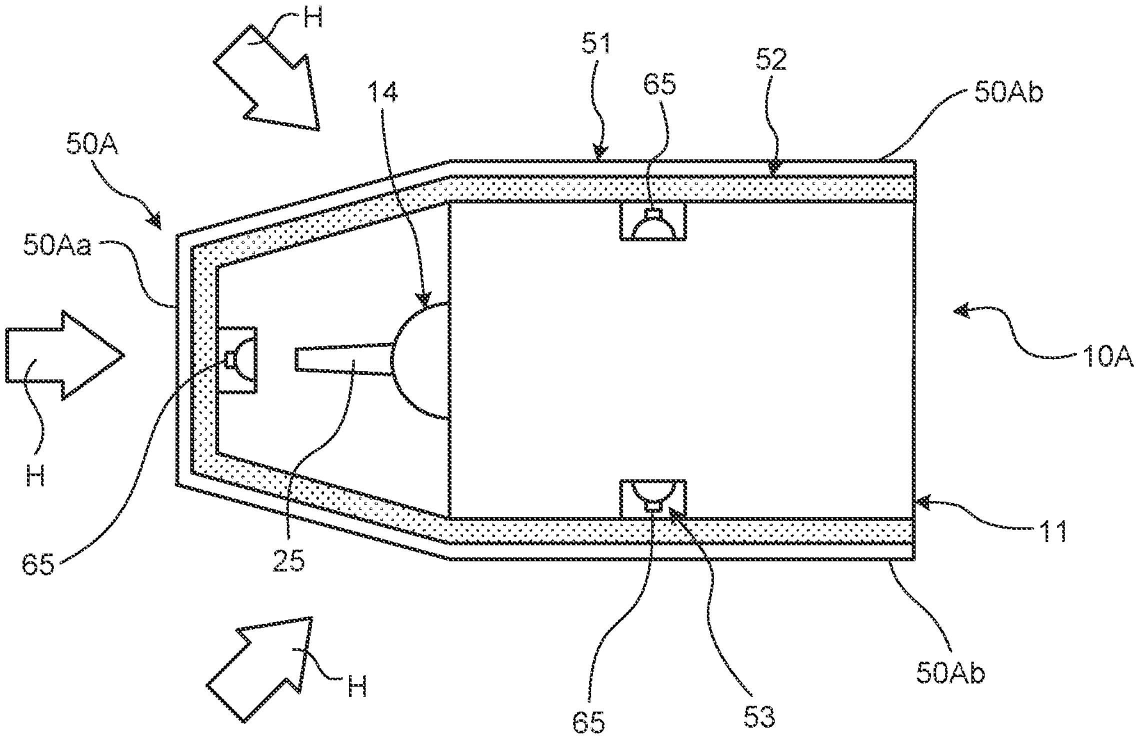
FIG. 5 is a plan view generally illustrating the service vehicle.

FIG. 4 is a schematic view generally illustrating a service vehicle equipped with a radiant heat protection device according to a second embodiment. FIG. 5 is a plan view generally illustrating the service vehicle. Members having the same functions as those of the first embodiment are given the same reference signs and specific explanations thereof are omitted.

In the second embodiment, as illustrated in FIGS. 4 and 5, this radiant heat protection device 50A is disposed at a periphery of a water-discharging vehicle (service vehicle) 10A.

The water-discharging vehicle 10A includes, in the same manner as the water-discharging vehicle 10 according to the first embodiment, a vehicle body 11, a traveling device 12, a steering device 13, a water-discharging device 14, a wireless device 15, a control device 16, and a battery 17.

The radiant heat protection device 50A is disposed at a periphery of the vehicle body 11. The radiant heat protection device 50A includes a first radiant heat protector 50Aa disposed at the front of the vehicle body 11 and second radiant heat protectors 50Ab disposed at the left and right sides of the vehicle body 11. The first radiant heat protector 50Aa and the second radiant heat protectors 50Ab may be separate members, but it is preferred that these protectors are installed with no space left therebetween. Although the radiant heat protection device 50A is provided at the front and the left and right sides of the vehicle body 11, the radiant heat protection device 50A may be provided at any side of the front, left and right, and rear of the vehicle body 11 and some of the front part, side parts, and rear part may be provided contiguously.

The radiant heat protection device 50A includes a radiant heat reflector 51, a coolant retainer 52, and a coolant feed device 53.

The radiant heat reflector 51 includes a coolant retainer 52 that can retain the coolant C disposed on a back surface 51*b* of a reflective surface 51*a*. The coolant retainer 52 is disposed at the front and the left and right sides of the vehicle body 11. The coolant retainer 52 can cool the radiant heat reflector 51 by heat of vaporization due to the evaporation of the retained coolant C. The coolant feed device 53 is configured to feed the coolant C to the coolant retainer 52 and includes a storage tank 62, a coolant feed pipe 63, a coolant feed pump 64, and coolant spray nozzles 65. The coolant spray nozzles 65 each face the coolant retainer 52 disposed at the front and the left and right sides of the vehicle body 11 and spray the coolant C to the coolant retainer 52.

The service vehicle according to the second embodiment includes the vehicle body 11, the traveling device 12 that causes the vehicle body 11 to travel, and the radiant heat protection device 50A disposed at the front and the left and right sides of the vehicle body 11. Accordingly, the radiant heat reflector 51 can be cooled by heat of vaporization due to the evaporation of the coolant C and the vehicle body 11 can be protected. The first radiant heat protector 50Aa protects the front of the vehicle body 11 and the second radiant heat protectors 50Ab protect the left and right sides of the vehicle body 11, so that workability and safety of various operations can be improved.

The coolant retainer 52 described in the embodiments above is a water-absorbent member and is attached to the back surface 51*b* of the radiant heat reflector 51, but the present invention is not limited to this. For example, the radiant heat protection device may include, at the back surface 51*b* of the radiant heat reflector 51, a coolant tank that can retain the coolant and may be configured to make the coolant C stored in the coolant tank in direct contact with the back surface 51*b* of the radiant heat reflector 51.

In the embodiments above, the radiant heat protection device according to the present invention is installed to a water-discharging vehicle (fire truck) that is described as a service vehicle, but the service vehicle is not limited to this. For example, the service vehicle equipped with the radiant heat protection device according to the present invention may be an operating robot for use in various types of disaster scenes. The radiant heat protection device according to the present invention may be installed to, for example, a building, not limited to the service vehicle.

REFERENCE SIGNS LIST

10, 10A Water-discharging vehicle (service vehicle)
11 Vehicle body
12 Traveling device
13 Steering device
14 Water-discharging device
15 Wireless device
16 Control device
17 Battery
50, 50A Radiant heat protection device
50Aa First radiant heat protector
50Ab Second radiant heat protector
51 Radiant heat reflector
52 Coolant retainer
53 Coolant feed device
62 Storage tank
63 Coolant feed pipe
64 Coolant feed pump
65 Coolant spray nozzle
66 Thermo sensor
C Coolant
H Radiant heat

The invention claimed is:

1. A radiant heat protection device comprising:

a radiant heat reflector that is a flattened member, the radiant heat reflector having a reflective surface that reflects radiant heat;

a coolant retainer that is a flattened member and is a water-absorbent member that can retain a coolant, and capable of retaining the coolant which is water, and the flattened member is fixed to a back surface of the reflective surface of the radiant heat reflector;

a coolant feed device including a spray nozzle configured to spray the coolant, a storage tank for holding coolant, and a coolant feed pump that supplies the coolant from the storage tank to the spray nozzle, the coolant feed device being disposed to make a predetermined space between the coolant feed device and the coolant retainer to feed the coolant to the coolant retainer;

a control device configured to cause the coolant to be supplied to the coolant retainer from the coolant feed pump, and a thermo sensor configured to measure a temperature of the back surface of the radiant heat reflector; wherein the control device is configured to activate the coolant feed device when the temperature of the back surface measured by the thermo sensor exceeds a preset upper temperature limit.

2. The radiant heat protection device according to claim 1, wherein the coolant retainer has an opening to an upper part thereof and the opening enabling evaporation of the coolant retained by the coolant retainer to pass therethrough.

3. A service vehicle comprising:

a vehicle body;

a traveling device configured to cause the vehicle body to travel; and the radiant heat protection device according to claim 1 disposed at least at a front part, a side part or a rear part of the vehicle body.

4. The service vehicle according to claim 3, wherein the radiant heat reflector and the coolant retainer are disposed at a periphery of the vehicle body, and the coolant feed device is disposed at the vehicle body.

5. The service vehicle according to claim 3, further comprising a water-discharging device different from the spray nozzle, and a connecting pipe in which one end branches and connects to the coolant feed device and the water-discharging device, and the other end is connected to a hose coupler connected to a water source.

6. The service vehicle according to claim 3, further comprising a protection wall device disposed at a front portion of the service vehicle and covering a front end surface of the vehicle body, wherein the radiant heat reflector and the coolant retainer are disposed at the protection wall device such that the coolant retainer on the back surface of the radiant heat reflector faces the front end surface of the vehicle body, and the coolant feed device is disposed at the vehicle body.

7. A radiant heat protection method comprising:

reflecting radiant heat on a reflective surface of a radiant heat reflector that is a flattened member;

measuring a temperature of a back surface of the radiant heat reflector; and when the temperature of the back surface measured exceeds a preset upper temperature limit, spraying a coolant which is water from a spray nozzle to a coolant retainer that is a flattened member and is a water-absorbent member that can retain the coolant, and the flattened member is fixed to a back surface of the reflective surface of the radiant heat reflector, the spray nozzle being disposed to make a predetermined space between the spray nozzle and the coolant retainer and supplying the coolant to the coolant retainer.

* * * * *